Dec. 7, 1926.
W. R. WOODWARD
1,609,926
RUNWAY FOR SLIDING GLASS PANES
Filed April 10, 1922
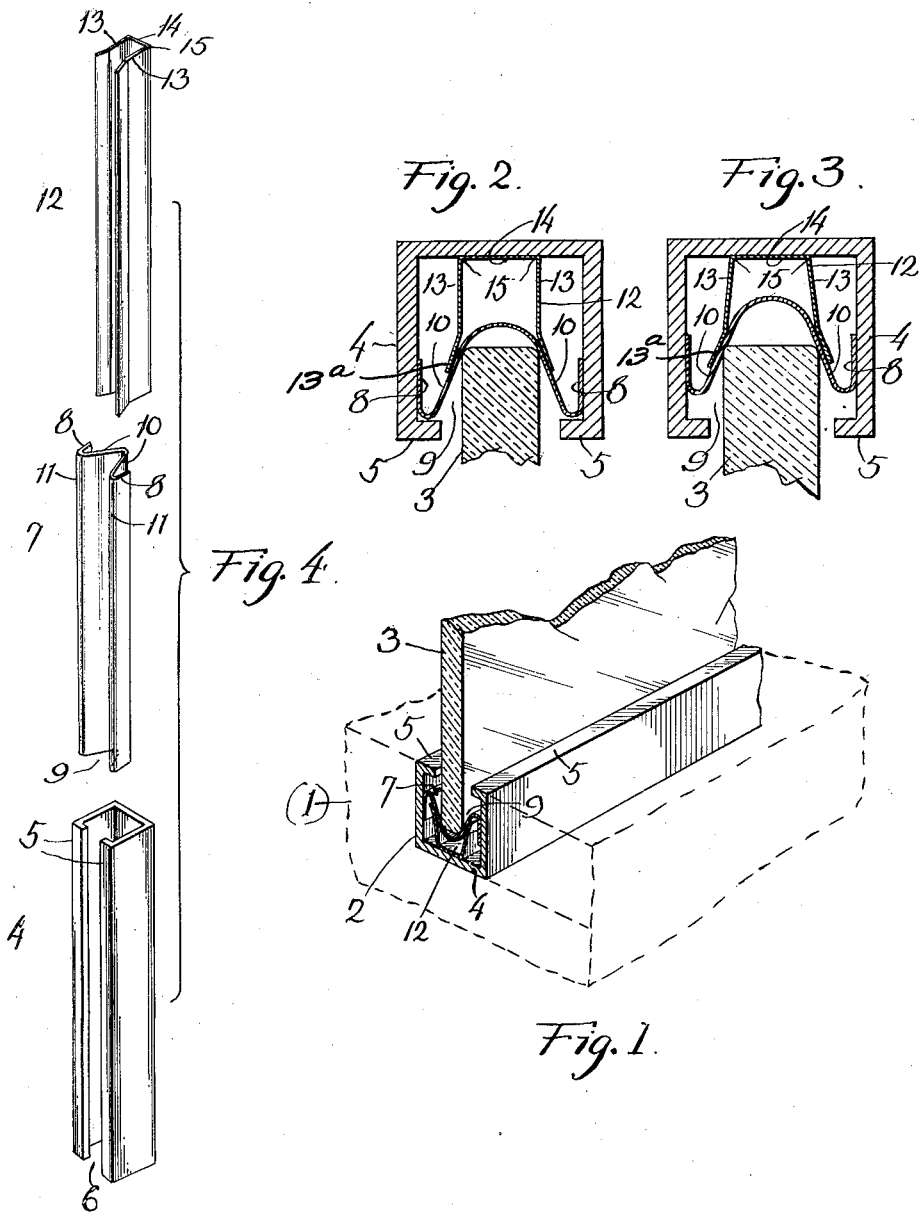

Patented Dec. 7, 1926.

1,609,926

UNITED STATES PATENT OFFICE.

WELLINGTON R. WOODWARD, OF AMESBURY, MASSACHUSETTS, ASSIGNOR TO NEW ENGLAND MANUFACTURING COMPANY, OF DETROIT, MICHIGAN, A CORPORATION OF MICHIGAN.

RUNWAY FOR SLIDING GLASS PANES.

Application filed April 10, 1922. Serial No. 551,271.

The invention has relation to runways and anti-rattling means for the sliding glass panes of windows and doors, designed mainly for use with the doors or windows of closed automobile bodies, an object being to provide a device to take different thicknesses of glass equally well without gripping or undue frictional engagement with the glass, and which will be rigid and practically indestructible.

With automobile doors and windows for closed automobile bodies, the glass panes in the windows of the doors vary somewhat in thickness—that is, due to the method of manufacture of the glass, there is as much as one-eighth of an inch variation in the thickness and further, in the cutting and finishing of the pane, some variation in the width of the pane occurs—that is, the distance from one vertical edge to the other of the pane is not absolutely uniform. An object of my invention is therefore to not only provide a weather strip and anti-rattling means for the glass that will take different thicknesses of glass but to provide a construction whereby the channels for the vertical edges of the glass do not require to be positioned an exact distance apart but may vary slightly as is usually the case in the manufacture of an automobile body and thereby securing an anti-rattling means that may be uniformly used with glass of different thicknesses and different widths.

The object of the invention therefore is to provide a fixed channel member for opposite edges of the vertically movable glass pane adapted to permit the pane to slide freely and automatically take various thicknesses of the glass and to accommodate panes of different widths between the vertical edges within the limitations of the take-up features of the strips as is hereinafter more fully described.

The invention consists in the novel construction and combinations of parts as hereinafter set forth.

In the accompanying drawings illustrating the invention, the numeral 1 designates the door or window frame or pillars having vertical grooves 2, wherein is located the glass pane 3 slidable vertically therein.

It has been customary hitherto to line the grooves 2 with or form the grooves of suitable channel metal lined with felt or the like, the slidable glass pane working in the grooves and having the vibration thereof taken up by the felt. It has also been customary to provide spring metal flanges in the grooves 2 having elastic contact with the sliding glass panes.

In the present case, the groove 2 is formed or lined with a channel metal strip 4 of substantial rigid nature and formed with lateral inturned free edge flanges 5, 5, spaced apart by a vertical interval 6 wherein the glass pane fits and slides.

Fitting within the channel strip 4 is a spring metal channel strip 7, having lateral flanges 8 in elastic or yieldable sliding engagement with the side walls of the strip 4, and a tapering channel 9, the converging walls 10 of which are joined to the side flanges 8 by acute angle bends 11, the thickness of the spring channel strip 7 being less than that of the rigid channel strip 4 whereby the former is allowed a sliding horizontal movement in the latter.

Fitting within the channel of the strip 4 is also a spring metal channel strip 12 which backs up the spring metal channel strip 7, and consists of lateral spring flanges 13, 13, connected together by a transverse vertical wall 14 joined to said flanges by bends 15, the free edge portions of the flanges 13, converging towards the transverse wall 14 and diverging towards the converging walls 10 of the strip 9, with which they are in lateral contact and to which they are parallel, or approximately so. The strip 12 is also of less thickness than that of the strip 4, and the strip 12 engaged or in contact as stated with the strip 7 are together of less thickness than that of the strip 4, in the channel of which the two spring strips in contact as stated are movable inwardly and outwardly or horizontally towards and away from the lateral edge of the window opening.

The glass pane 3, sliding within the vertical interval 6, is engaged at its lateral edges with the channels of the strips 7 at each side of the window, the lateral edge of the pane at each side of the window having contact with the converging walls 10 of the strip 7, and having the effect of pressing the strip 7 laterally and away from the lateral edge of the window opening to cause a sliding movement of the walls 10 upon the similarly converging free edge portions 13ᵃ of the spring flanges 13, thereby causing a spread of the flanges 13 to a greater or less extent according to the thickness of the glass pane in panes of uniform breadth, the flanges 13 being thereby put under spring tension at the bends 15 to take up and prevent any undue edgewise play of the glass pane in its seat between the spring strips at the opposite edges of the window opening, the spring flanges 8 being in elastic contact with the side walls of the strip 4 to take up and prevent any undue lateral play of the glass pane in said seats. The engagement of the free end portions 13ᵃ of the flanges 13 with the converging walls 10 of the strip 7 also has effect in taking up and preventing any undue lateral play of the pane.

Owing to the fact that the converging walls 10 of the strip 9 permit of the entrance of the edge portions of glass panes of different thicknesses within the channel 9 of said strip to a greater or less degree without alteration of the frictional engagement of the spring flanges 8 of said strip with the side walls of the strip 4, there will be no gripping of the glass pane by the said converging walls 10, although said converging walls will effectually prevent any lateral play of the glass pane in said channel. In other words the action of the strip 7 in resisting and preventing lateral play of the glass panes of different thicknesses within the channel 9 of said strip is always the same whether the pane be thin or thick.

The action of the spring channel strip 12 which backs up the strip 7 and prevents edgewise play of the glass is not designed to be greatly altered whether the branches 13 thereof are closer together as with a thin glass pane or spread farther apart as with a thick glass pane, so that the frictional bind or engagement with the glass pane of the device as a whole is intended to remain nearly constant in all cases of thick and thin glass panes.

It is obvious that the parts of the invention may be made of suitable material other than metal.

I claim:—

1. In a weather strip, a spring metal strip of channel form having vertical converging walls adapted to engage the vertical edges of glass panes of different thicknesses, and lateral spring flanges adapted to have elastic sliding contact with the side walls of the groove of the window or door frame and having bend connections with the adjacent edges of said converging walls.

2. In a weather strip, a spring metal strip having a tapered channel adapted to receive and engage the vertical edge portions of glass panes of different thicknesses, and having lateral spring flanges adapted for elastic sliding contact with the side walls of the groove of a door or window frame.

3. In a weather strip, a spring metal strip having a tapered channel adapted to engage the vertical edges of glass panes of different thicknesses, and lateral spring flanges adapted for elastic contact with the groove of a door or window frame, and spring means for backing up said strip and normally tensioned to press the strip against the vertical edge of said pane.

4. In a weather strip, a spring metal strip having a tapered channel adapted to engage the vertical edges of glass panes of different thicknesses and lateral spring flanges engaging the side walls of the groove of a casing to take up and prevent undue lateral play of the glass pane, and spring means backing up said strip to take up and prevent undue edgewise play of said pane.

5. In a weather strip, a spring metal strip having a tapered channel engaging the vertical edge of a glass pane and lateral spring flanges engaging the side walls of a groove of a casing, said channel adapted to engage the vertical edges of glass panes of different thicknesses, and said flanges acting to take up and prevent undue lateral play of the glass pane, and a channel strip backing up the first named strip and having lateral spring flanges the free edges of which engage the side walls of the said tapered channel to take up and prevent undue edgewise play of the glass pane.

6. In a weather strip, a body strip of channel metal of rigid substantial nature and having inturned free edge flanges spaced apart, a spring metal strip within the body strip and having a tapered channel the side walls of which are adapted to engage the vertical edges of glass panes of different thicknesses, and lateral spring flanges engaging the side walls of said body strip, and a spring metal strip of channel form backing up the first named spring metal strip.

7. In combination with a slidable glass pane and fixed channel members for opposite edges thereof, of an anti-rattling and pane supporting means in each channel consisting of a spring metal channel having converging walls providing a seat for the pane edge, said channel being slidable laterally in the fixed channel and adapted to yieldably support the pane from movement transversely therein, and yieldable means resisting lateral movement of the spring metal channel in the fixed channel.

8. The combination with a slidable glass pane and fixed channels for opposite edges thereof, of anti-rattling and pane supporting means in each of the channels consisting of a channel like member V-shaped in cross section providing a seat for the pane edge, said channel like member being slidable laterally in the fixed channel, and means for yieldably supporting said channel like member from lateral and from transverse movement in the fixed channel.

9. The combination with a slidable glass pane and fixed channels for opposite edges thereof, of an anti-rattling and pane supporting means in each of the channels consisting of a channel like member having a part V-shaped in cross section in which the edge of the pane seats and in which it is adapted to slide longitudinally, said channel like member being slidable laterally in the fixed channel, and means yieldably supporting the channel like member from lateral and from transverse movement in the fixed channel.

10. The combination with a slidable glass pane and fixed channels for opposite vertical edges thereof, of anti-rattling and pane supporting means in each of the said channels consisting of a channel like strip extending longitudinally of the fixed channel and having a part substantially V-shaped in cross section in which the edge of the pane seats and in which it is adapted to slide longitudinally, spring flanges at opposite sides of the V-shaped portion of the member having yieldable contact with the side walls of the fixed channel, and means yieldably resisting movement of the V channel toward the back of the fixed channel.

11. The combination with a slidable glass pane and fixed channels for opposite vertical edges thereof, of anti-rattling and pane supporting means in each of the said channels, consisting of a spring-metal channel having a form in cross section of V shape with return-bent lateral flanges engaging the side walls of the fixed channel and providing a seat for the edge of the pane in which it may slide longitudinally, a second channel member extending longitudinally of the first channel at the back thereof and having a form substantially U-shaped in cross section providing flanges having spring contact with the sides of the V portion of the pane supporting channel yieldably resisting lateral movement of the V channel.

12. The combination with a slidable window glass and a channel frame at opposite edges thereof, of anti-rattling and supporting means for the same in each of the channels consisting of a metal member having a portion V-shaped in cross section providing a seat for the edge of the glass and in which the glass is longitudinally slidable, spring flanges connected with the V-shaped portion having sliding contact with the side walls of the channel permitting lateral movement of the V member and yieldably resisting transverse movement thereof in the channel, and means yieldably resisting lateral movement of the V-shaped member.

13. A supporting frame for slidable glass panes consisting of a metal channel for the opposite side edges thereof having inturned flanges on one side spaced to provide a slot for the pane, anti-rattling and pane supporting means in each of the metal channels consisting of a metal member substantially V-shaped in cross section extending longitudinally of the metal channel and having side flanges in spring contact with opposite sides thereof, and yieldable means forcing the V channel toward the inturned flanges.

14. A supporting frame for slidable glass panes consisting of a frame for opposite side edges of the pane, a metal channel fixed to the said frames and having inturned flanges providing a slot for the pane on one side of the channel, pane supporting means in each metal channel consisting of a spring metal strip having a central portion substantially V-shaped in cross section and integral side flanges return-bent and in contact with the side walls of the fixed metal channel, the said V channel extending substantially the full length of the fixed metal and providing a seat for the pane in which it is slidable longitudinally, a second spring metal strip supported at the back of the fixed metal channel and having opposite side flanges lying in contact with the inner face of the V-shaped portion of the pane supporting channel and tending to force the V channel toward the inturned flanges of the fixed metal channel and yieldably resisting movement of the pane supporting channel in the opposite direction.

In testimony whereof I affix my signature.

WELLINGTON R. WOODWARD.